(12) United States Patent
Schlüter

(10) Patent No.: US 11,046,008 B2
(45) Date of Patent: Jun. 29, 2021

(54) RECEPTACLE AND METHOD FOR THE ADDITIVE MANUFACTURING OF A RECEPTACLE

(71) Applicant: Airbus Defence and Space GmbH, Taufkirchen (DE)

(72) Inventor: Ralf Schlüter, Taufkirchen (DE)

(73) Assignee: Airbus Defence and Space GmbH

( * ) Notice: Subject to any disclaimer, the term of this patent is extended or adjusted under 35 U.S.C. 154(b) by 279 days.

(21) Appl. No.: 15/723,280

(22) Filed: Oct. 3, 2017

(65) Prior Publication Data

US 2018/0099455 A1    Apr. 12, 2018

(30) Foreign Application Priority Data

Oct. 7, 2016  (DE) .......................... 102016219458.5

(51) Int. Cl.
*B29C 64/393*    (2017.01)
*B29C 64/106*    (2017.01)
(Continued)

(52) U.S. Cl.
CPC .......... *B29C 64/393* (2017.08); *B29C 64/106* (2017.08); *B29C 64/141* (2017.08);
(Continued)

(58) Field of Classification Search
CPC ..... B29C 67/0059; B29C 67/00; B29C 64/00; B29C 64/393; B29C 64/141; B33Y 10/00; B33Y 50/02
See application file for complete search history.

(56) References Cited

U.S. PATENT DOCUMENTS 10,300,661 B2 *  5/2019  Marozin ................ B33Y 40/00
2008/0241404 A1  10/2008  Allaman et al.
(Continued)

FOREIGN PATENT DOCUMENTS

EP    1120228 A2    8/2001
RU    2417890 C2    5/2011
(Continued)

OTHER PUBLICATIONS

3-D-Druck für den Prototypenbau, (3D printing for prototype construction) Global SMT & Packaging, Oct. 14, 2015 (page translated via Google translate (machine translation)).
(Continued)

*Primary Examiner* — Matthew J Daniels
*Assistant Examiner* — Shibin Liang
(74) *Attorney, Agent, or Firm* — Lerner, David, Littenberg, Krumholz & Mentlik, LLP

(57) ABSTRACT

A method for the additive manufacturing of a receptacle for storing and/or transporting a product includes three-dimensionally capturing the external form of the product, compiling a computer-readable data set with information about the captured external form of the product, and additively manufacturing the receptacle. In a computer-controlled manner on the basis of the compiled data set, a modelling material is deposited in layers, liquefied and cured. The receptacle is formed having an internal structure which surrounds a receiving chamber that is adapted to the external form of the product.

12 Claims, 1 Drawing Sheet

(51) Int. Cl.
  *B29C 64/165* (2017.01)
  *B33Y 10/00* (2015.01)
  *B33Y 50/02* (2015.01)
  *B33Y 80/00* (2015.01)
  *B29C 64/141* (2017.01)
  *B65D 81/05* (2006.01)
  *B29L 31/00* (2006.01)

(52) U.S. Cl.
  CPC ............ *B29C 64/165* (2017.08); *B33Y 10/00* (2014.12); *B33Y 50/02* (2014.12); *B33Y 80/00* (2014.12); *B65D 81/05* (2013.01); *B29L 2031/712* (2013.01)

(56) References Cited

U.S. PATENT DOCUMENTS

| | | | |
|---|---|---|---|
| 2009/0174709 A1* | 7/2009 | Kozlak | G06F 17/50 345/420 |
| 2010/0086721 A1 | 4/2010 | Batchelder | |
| 2015/0096266 A1 | 4/2015 | Divine et al. | |
| 2015/0101899 A1 | 4/2015 | Russo | |
| 2017/0253354 A1* | 9/2017 | Colson | B65D 75/527 |
| 2017/0253401 A1* | 9/2017 | Bouthillier | B65B 55/20 |

FOREIGN PATENT DOCUMENTS

| | | |
|---|---|---|
| WO | 01/30292 A2 | 5/2001 |
| WO | 2015145346 A1 | 10/2015 |

OTHER PUBLICATIONS

"Jigs and Fixtures: More Profitable Production," STRATASYS 3D Printing Tools, Oct. 31, 2014, pp. 1-7.

* cited by examiner

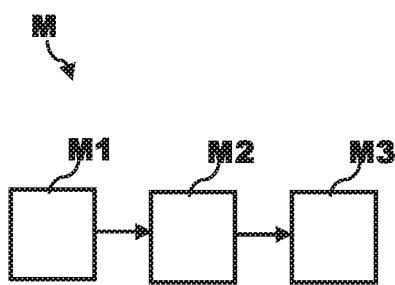
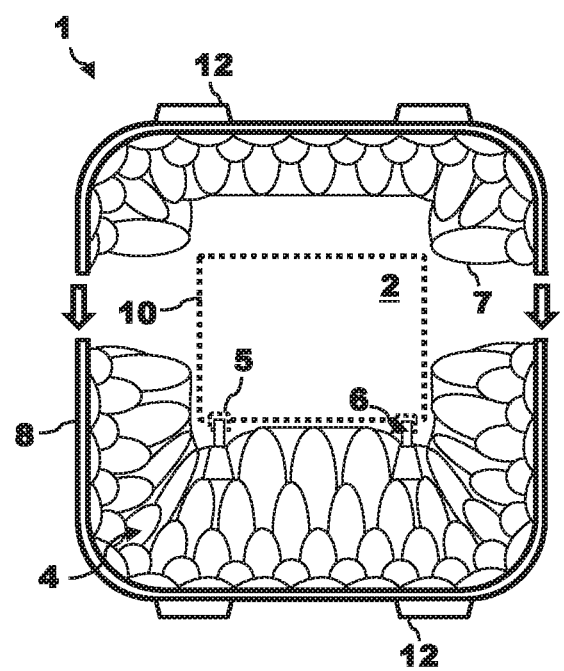
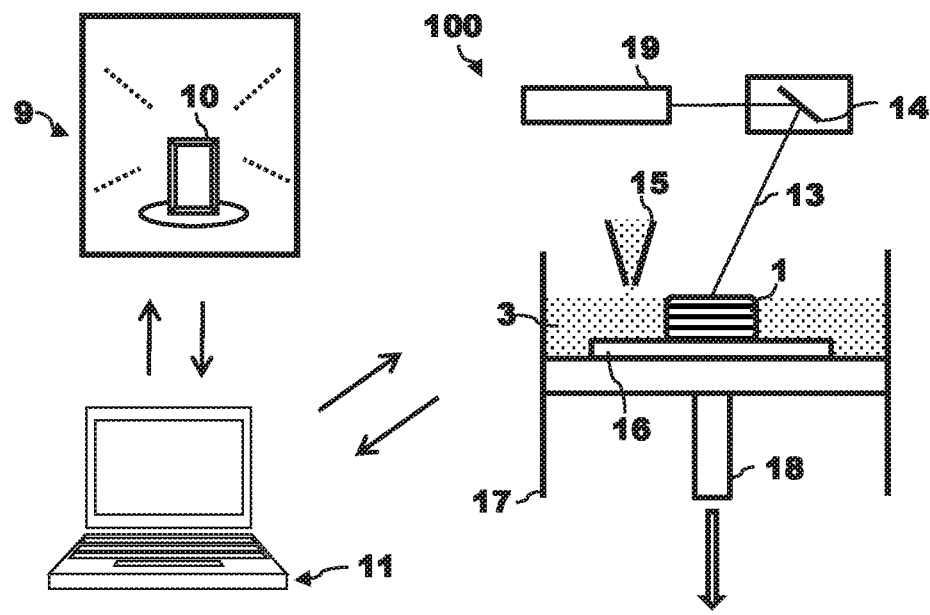

RECEPTACLE AND METHOD FOR THE ADDITIVE MANUFACTURING OF A RECEPTACLE

FIELD OF THE INVENTION

The present invention relates to a method for the additive manufacturing of a receptacle for storing and/or transporting a product. The present invention also relates to a receptacle which is manufactured by means of such a method. In particular, the present invention concerns product-specific manufacturing of transport containers and/or storage containers.

BACKGROUND OF THE INVENTION

For transporting and/or storing technical instruments and/or very complex, sensitive and high-value products, as frequently used in the aviation industry, for example, receptacles are conventionally individually fabricated and optimised for the product in question. Such containers which are optimised by type are often manufactured in a complex manner from various materials using expensive tools and/or with a great deal of manual effort. In many cases, a housing made of a metal or a metal alloy and/or a plastics material is provided internally with liners and/or inserts made of foam material, rubber, plastics material, felt and/or wood or the like, which are intended to receive, fix and protect the corresponding technical instrument in a reliable manner and with an exact fit. Such containers can be not only extremely expensive, e.g. the costs for a container can sometimes be more than 10% of the value of the goods to be transported, but they can also often only be produced in a very laborious manner (in terms of time).

In generative or additive manufacturing methods, also generally known as "3D-printing methods", starting from a digitalised geometric model of an object, one or more starting materials are sequentially built up one on top of the other in layers and cured. Thus, for example, in selective laser melting (SLM), a component is built up in layers from a modelling material, for example a plastics material or a metal, by the modelling material being applied in powder form to an underlayer and being liquefied in a targeted manner by means of local laser irradiation, whereby, after cooling, a solid, continuous component is produced. 3D printing offers exceptional design freedom and allows, inter alia, objects to be produced with reasonable outlay, which objects could not be produced, or could only be produced with considerable outlay, by means of conventional methods. For this reason, 3D printing methods are currently widely used in industrial design, in the automotive industry, in the aerospace industry or generally in industrial product development in which a resource-efficient process chain is used for the needs-based, small-scale production and mass production of individualised components.

SUMMARY OF THE INVENTION

Against this background, it is an idea of the present invention to find simple solutions for containers for receiving high-priced technical goods.

A method for the additive manufacturing of a receptacle for storing and/or transporting a product is accordingly provided. The method comprises three-dimensionally capturing the external form of the product, compiling a computer-readable data set, which comprises information about the captured external form of the product, and additively manufacturing the receptacle. Here, in a computer-controlled manner, on the basis of the compiled data set, a modelling material is deposited in layers, liquefied and cured. The receptacle is formed having an internal structure which surrounds a receiving chamber that is adapted to the external form of the product.

Furthermore, a receptacle is provided which is manufactured by means of a method according to the invention.

Furthermore, a computer-readable medium is provided, on which computer-executable instructions are stored which, when executed by means of a data processing device, prompt the data processing device to carry out a method according to the invention.

The concept underlying the present invention consists in manufacturing receptacles, for transportation or storage, in a product-specific manner by means of a 3D printing device. For this purpose, all that is necessary is for the external form of the product to be three-dimensionally captured once. This can be carried out by means of a 3D scanner or the like, for example. In principle, additional characteristics beyond the external form of the product can also be captured, e.g. the weight, the weight distribution, etc. This concept according to the invention has the significant advantage that the receptacle can be optimally adapted to the particular requirements of the product to be received, for example a technical instrument. Furthermore, computer-aided algorithms can be used in order to construct the appropriate receptacle as advantageously as possible, e.g. in terms of geometry or material. In one example, finite element methods (FEM) can be used, by means of which the actions of force, load paths, etc., for example, inside the receptacle are simulated in order to calculate an optimal geometric and structural embodiment of the receptacle for a particular predefined product. As soon as the receptacle has been calculated once for a particular product, this configuration can be stored on a computer-readable medium. In principle, any number of containers of this type can thus be very simply printed. For example, a 3D printing device can be provided at a corresponding storage or transshipment point, by means of which device a suitable receptacle for highly sophisticated technical instruments can be produced at any time. By means of the method according to the invention, an optimal receptacle can be completely integrally manufactured in a single printing process, without special outlay or even manual work being necessary. In principle, the receptacle according to the invention can be manufactured from all of the materials or material combinations for which additive methods are known. For example, the receptacle can be formed from one or more plastics materials, e.g. acrylonitrile butadiene styrene (ABS).

3D printing processes are advantageous in particular since they make it possible to produce three-dimensional components in primary forming methods without the need for special manufacturing tools adapted to the outer shape of the components. This allows for highly efficient, material-saving and time-saving production processes for components. 3D printing methods of this kind are particularly advantageous in the aerospace industry, since a large number of different components are used here which are adapted to specific uses and can be produced in 3D printing methods of this kind at low costs, with low production lead times and low complexity in the manufacturing plants required for production.

3D printing methods within the context of the present application include all generative or additive manufacturing methods in which objects having a predefined shape are produced, on the basis of geometric models, from amorphous materials such as liquids and powders or from neutrally shaped semi-finished products such as strip-like or wire-like material by means of chemical and/or physical processes in a special generative manufacturing system. In the context of the present application, 3D printing methods use additive processes in which the starting material is built up sequentially in layers to form predetermined shapes.

According to a development, the data set can comprise information about usable mounting points of the product. The internal structure can be formed so as to have mounting elements, each of which is designed to hold the product on one of the mounting points. For example, locating pins can be printed into a base and/or top region of the internal structure, into which the product can be inserted via corresponding recesses or openings. However, depending on the product, it can also be possible or advantageous to adapt the internal structure to the product for an exact fit, in such a way that additional mounting or fastening of the product inside the receptacle is not necessary.

According to a development, the mounting elements can be resiliently formed in the internal structure. In so doing, the mounting elements can transition into the internal structure in a particularly smooth manner.

According to a development, the internal structure can be optimised for the weight and/or the weight distribution of the product.

For this purpose, the internal structure, for example, can be formed having a plurality of interconnected support members. By means of computer-aided algorithms, for example an internal structure can be calculated that offers an ideal compromise between weight and stability. In particular, known construction methods from the field of bionic design can be used for this purpose, which construction methods, for example in a manner inspired by natural bone growth, suggest a predominantly hollow and yet strong and resistant internal structure in order to save weight, through which structure a plurality of support members pass. In one specific example, a "bird bone structure" of this type results from a seal arrangement that provides a particularly large number of supporting structures or particularly strong supporting structures on the outer edge of the internal structure, which supporting structures are always lighter inside the internal structure.

According to one development, the data set can comprise information about characteristic protection requirements for the product. The internal structure can be formed such that specific characteristic variables of the internal structure are optimised for the protection requirements.

For this purpose, the specific characteristic variables are selected for example from the group consisting of thermal conductivity, electrical conductivity, permeability, porosity, chemical resistance, resilience, hardness, strain hardness and strength or the like.

According to one development, the internal structure can be formed so as to receive the product with an exact fit.

According to one development, the internal structure can be formed in order to completely surround the product. In particular, the receptacle can be designed to be pressure-tight and/or fluid-tight.

According to one development, the receptacle can be formed so as to have a multipart housing. The individual housing components can be provided with edge seals, for example, and therefore even a multipart receptacle can be designed to be sealed against gases, moisture and/or liquid. 3D printing methods have the very significant advantage that both seals and other functional elements can be directly printed in a single method together with the receptacle itself. For example, pressure valves, transparent windows and/or displays can be printed integrally with the receptacle.

According to one development, the receptacle can be formed so as to be re-closable. For example, a receptacle of this type can consist of two half-shells which can be closed together by means of joints, snap-in or plug-in closures or other locking technologies. Such closures can be directly printed into the receptacle together therewith. However, threads or fastening elements of a general type can also be printed into the receptacle together therewith in the method according to the invention without additional outlay. For example, guide rails or guiding elements can be provided externally on the housing of the receptacle, by means of which a plurality of receptacles can be stacked one on top of the other.

The above-mentioned embodiments and developments can be combined in any manner, if appropriate. Further possible embodiments, developments and implementations of the invention include combinations of features of the invention described previously or below with respect to the embodiments, even if not explicitly specified. In particular, a person skilled in the art will also add individual aspects as improvements or supplements to the particular basic form of the present invention.

BRIEF DESCRIPTION OF THE DRAWINGS

The present invention will be described in greater detail below with reference to the embodiments shown in the schematic drawings, in which:

FIG. 1 is a schematic flow diagram of a method according to the invention in accordance with an embodiment of the invention;

FIG. 2 is a schematic view of a 3D printing device for carrying out the method from FIG. 1; and FIG. 3 is a schematic sectional view of a receptacle according to an embodiment of the invention, which receptacle is manufactured by means of a method according FIG. 1.

The accompanying drawings are intended to facilitate further understanding of the embodiments of the invention. Said drawings illustrate embodiments and, together with the description, serve to explain principles and concepts of the invention. Other embodiments and many of the advantages mentioned can be found with reference to the drawings. The elements of the drawings are not necessarily shown true to scale relative to one another.

In the figures of the drawings, identical, functionally identical and identically operating elements, features and components are respectively provided with the same reference numerals, unless indicated otherwise.

DETAILED DESCRIPTION

FIG. 1 is a schematic flow diagram of a method M according to the invention in accordance with an embodiment of the invention, by means of which method a receptacle 1, as shown schematically in FIG. 3, is additively manufactured. For this purpose, FIG. 2 is a schematic view of a 3D printing device 100, by means of which such a method M can be carried out.

In M1, the method M provides the three-dimensional capture of the external form of a product 10 which is intended to be transported and/or stored by means of the receptacle 1. For example, in this case said product may be a component of an aircraft or spacecraft. For this purpose, a 3D scanner 9 can be used, for example, as is schematically shown in FIG. 2. In a 3D scanner of this type, the surface of the product 10 is systematically scanned in a grid-like manner by a laser, as a result of which the external form can be very precisely measured and, on the basis thereof, a digital reconstruction of the surface geometry and surface structure of the product 10 can be carried out. It is fundamentally clear to a person skilled in the art that other appropriate methods can be used as well, by means of which a 3D reconstruction of elements can be performed, e.g. structured light scanning or similar methods.

In M2, the method M provides compiling of a computer-readable data set which comprises information about the captured external form of the product 10. The data set can be supplemented by additional information, e.g. the weight, the weight distribution and/or the seal arrangement of the product 10. Furthermore, the data set can comprise for example information about characteristic protection requirements for the product 10, such as the sensitivity of the product 10 to knocks or other mechanical influences, a permitted temperature range or the specification of a particular protective atmosphere having predetermined pressure limits.

On the basis of the digitalised and optionally further processed model of the product 10, and on the basis of the specified protection requirements, an optimised receptacle 1 can be simulated and calculated on a computer 11 by means of computer-aided algorithms. For this purpose, finite element methods can be used, for example. By means of such methods, the actions of force, the load paths, etc. inside the receptacle 1 can be determined and, on the basis thereof, an optimal geometric and structural embodiment of the receptacle 1 can be calculated for a particular predetermined product 10.

Furthermore, in M3 the method provides the additive manufacturing of the receptacle 1. This involves a modelling material 3, e.g. a plastics material such as ABS, a metal, a metal alloy, a metallic material and/or a combination of these materials being deposited in layers, liquefied and cured in a computer-controlled manner on the basis of the compiled data set. According to the additive process engineering used, the modelling material 3 can first be liquefied and then deposited or first deposited and then liquefied. The modelling material 3 is consecutively layered in successive layers one on top of the other such that the receptacle 1 is formed having an internal structure 4 that surrounds a receiving chamber 2 that is adapted to the external form of the product 10. The receiving chamber 2 receives the product 10 (in FIG. 3 the product 10 is merely indicated by dashed lines for the sake of clarity).

For the additive manufacturing of the receptacle 1, the modelling material 3 is fed to a 3D printing device 100, as is shown in FIG. 2. For this purpose, the modelling material 3 can be in powder form, for example. The present invention fundamentally provides various options for liquefying the modelling material 3, in which methods heat can be locally introduced into the deposited modelling material 3 in a targeted manner. The use of lasers and/or particle beams, e.g. electron beams, is particularly advantageous since in this case heat can be produced in a very targeted and controlled manner. The additive manufacturing can thus be selected from the group consisting of selective laser sintering, selective laser melting, selective electron-beam sintering and selective electron-beam melting or the like, for example. However, in principle, any additive method can be used. In the following, the method M will be explained by way of example in conjunction with selective laser melting (SLM) in which the modelling material 3 is applied in powder form to a work platform 16 and is liquefied in a targeted manner by local laser irradiation by a laser beam 13, whereby, after cooling, a continuous receptacle 1 is produced.

An energy source in the form of a laser 19, for example a Nd:YAG laser, sends a laser beam 13 in a locationally selective manner to a specific part of a powder surface of the powdered modelling material 3, which lies on a work platform 16 in a working chamber 17. For this purpose, an optical deflector or a scanner module, such as a movable or tiltable mirror 14, can be provided which, depending on its tilt position, deflects the laser beam 13 onto a specific part of the powder surface of the modelling material 3. The modelling material 3 is heated at the point of incidence of the laser beam 13 such that the powder particles are locally fused and form an agglomerate when cooled. Depending on the digital model of the receptacle 1 provided by the 3D scanner, which model is optionally further processed, the laser beam 13 scans the powder surface. After the selective melting and local agglomeration of the powder particles in the surface layer of the modelling material 3, excess, non-agglomerated modelling material 3 can be discarded. Thereafter, the work platform 16 is lowered by means of a lowering piston 18 (see the arrow in FIG. 2) and, by means of a powder feed 15 or another suitable means, new modelling material 3 is transferred from a reservoir into the working chamber 17. In order to accelerate the melting process, the modelling material 3 can be preheated by means of infrared light to a working temperature which is just below the melting point of the modelling material 3. In this way, a three-dimensional sintered or "printed" receptacle 1 made of agglomerated modelling material 3 results from an iterative generative construction process. In this case, the surrounding powdered modelling material 3 can support the part of the receptacle 1 constructed so far. The continuous downward movement of the work platform 16 results in layered model generation of the receptacle 1.

With reference to FIG. 3, in the following an embodiment of a receptacle 1 will be discussed by way of example which can be produced by means of the method M indicated above. The receptacle 1 is formed having an external housing 8 that consists of two half-shells which can be closed together (cf. the arrows in FIG. 3) and completely surround an inserted product 10 when closed. The housing 8 can be designed to be re-closable, for example by means of conventional auxiliary means that are known to a person skilled in the art, such as pressure, plug-in or snap-in closures or the like (not shown). The closures, possibly desired seals and additional functional elements can be directly printed during the additive manufacturing process into the receptacle 1 together therewith. For example, the receptacle 1 can be designed as a pressure-tight container. Appropriate means for altering and checking the pressure can be accordingly introduced into the receptacle 1. This may also be possible during the 3D printing process without additional steps being necessary. In FIG. 3, four stacking guides 12 are moulded on the receptacle 1 by way of example, by means of which a plurality of receptacles 1 of this type can be stacked one on top of the other.

The receptacle 1 in FIG. 3 comprises a hollow internal structure 4 inside the housing 8, which internal structure comprises a plurality of interconnected support members 7 which are integrally formed with the housing 8. The thickness of the support members 7 reduces from the outside to the inside. The receiving chamber 2 defined by the internal contour of the internal structure 4 is of such a size that the product 10 can be inserted into the receiving chamber 2, and thus the receptacle 1, so as to fit exactly. For mounting the product 10, a plurality of pin-like mounting elements 6 are formed in the receptacle 1 in FIG. 3, each of which is designed to hold the product 10 on mounting points 5 provided therefor on the product 10, and therefore said product is additionally fixed in the receiving chamber 2. Both the mounting elements 1 and the internal structure 4 itself can be resilient, and therefore the product 10 can be insulated as optimally as possible from external mechanical influences such as knocks or vibrations. Both the arrangement and the configuration of the internal structure 4, i.e. in particular the support members 7, and the positioning of the mounting elements 6 can be configured here by means of appropriate computer-aided optimisation algorithms. For example, the weight and/or the weight distribution of the product 10 can be included in this algorithm in order to achieve mounting points and damping properties of the internal structure 4 and the supporting structures 7 that are as advantageous as possible. A person skilled in the art would infer directly therefrom that the shown geometric embodiment of the internal structure 4 is merely given by way of example and different internal structures 4 may be advantageous for the particular application. For example, it may be advantageous for the internal structure 4 to be solid and without hollow structures. In other applications, a foam-material-like or foam-like form of the internal structure 4 may be advantageous without separate support members 7 being used.

Moreover, characteristic protection requirements for the product 10 can also be taken into account when forming the receptacle 1 and the internal structure 4 thereof. For example, specific characteristic variables of the internal structure 4 can be optimised for the protection requirements. Therefore, for example the thermal conductivity, the electrical conductivity, the permeability, the porosity, the chemical resistance, the resilience, the hardness, the strain hardness and/or the strength or the like of the internal structure 4 can be adapted to the specific requirements of the application in question, i.e. the product or technical instrument in question. Here, the computer-aided method M of the present invention has significant advantages over conventional methods.

By means of the method according to the invention, an appropriate receptacle 1 for highly sophisticated and expensive technical instruments can be completely manufactured in an integral manner in a single printing process without special outlay or even manual labour being necessary. For this purpose, the product 10 to be received has to be scanned-in only once and on the basis thereof a geometric configuration for the receptacle 1 for the specified constraints has to be calculated only once. As soon as a corresponding 3D model has been compiled or is available, a corresponding receptacle 1 can be printed at any time and at any place by means of an appropriately equipped 3D printing device, which receptacle has an ideal printed form and print thickness.

The described methods and receptacles can be used in general in all fields of the transport industry, for example for road motor vehicles, for rail vehicles or for watercraft, but also in civil engineering and mechanical engineering.

In the detailed description above, various features have been summarised in one or more examples so as to provide a more rigorous illustration. However, it should be clear here that the above description is of a purely illustrative, but in no way limiting nature. Said description is used to cover all alternatives, modifications and equivalents of the various features and embodiments. Many other examples will become immediately clear to a person skilled in the art owing to their expert knowledge in view of the above description.

The embodiments have been selected and described in order to be able to show, in the best possible way, the principles on which the invention is based and the possible applications thereof in practice. As a result, persons skilled in the art can optimally modify and use the invention and the various embodiments thereof with respect to the intended purpose thereof. In the claims and the description, the terms "containing" and "comprising" are used as linguistically neutral terminology for the corresponding term "including". Furthermore, use of the terms "a", "an" and "one" is not intended to fundamentally exclude a plurality of such described features and components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for the additive manufacturing of a receptacle, said method comprising:
   three-dimensionally capturing an external form of a product;
   compiling a computer-readable data set which comprises information about the captured external form of the product; and
   additively manufacturing the receptacle including a housing, wherein, in a computer-controlled manner on the basis of the compiled data set, a modelling material is deposited in layers, liquefied and cured, wherein the receptacle is formed having an internal structure which surrounds a receiving chamber that is adapted to the external form of the product,
   wherein the internal structure is formed having a plurality of interconnected support members, wherein the plurality of interconnected support members comprises a first plurality of interconnected members extending from the housing having a first thickness and a second plurality of interconnected members extending from the first plurality of interconnected members having a second thickness, wherein the second thickness is smaller than the first thickness.

2. The method of claim 1, wherein the data set comprises information about usable mounting points of the product and the internal structure is formed having mounting elements which are each configured to hold the product on one of the mounting points.

3. The method of claim 2, wherein the mounting elements are resiliently formed in the internal structure.

4. The method of claim 1, wherein the internal structure is optimised for at least one of the weight and the weight distribution of the product.

5. The method of claim 1, wherein the data set comprises information about characteristic protection requirements for the product and the internal structure is formed such that specific characteristic variables of the internal structure are optimised for the protection requirements.

6. The method of claim 5, wherein the specific characteristic variables are selected from the group consisting of thermal conductivity, electrical conductivity, permeability, porosity, chemical resistance, resilience, hardness, strain hardness and strength.

7. The method of claim 1, wherein the internal structure is formed so as to receive the product with an exact fit.

8. The method of claim 1, wherein the internal structure is formed so as to completely surround the product.

9. The method of claim 1, wherein the receptacle is formed having a multipart housing.

10. The method of claim 1, wherein the receptacle is formed so as to be re-closable.

11. The method of claim 1, wherein the plurality of interconnected members comprises a third plurality of interconnected members extending from the second plurality of interconnected members and having a third thickness, wherein the third thickness is smaller than the first thickness.

12. The method of claim 1, wherein the interconnected members of the second plurality of interconnected members are lighter than the interconnected members of the first plurality of interconnected members.

* * * * *